United States Patent [19]

Speer, Jr. et al.

[11] 4,275,500
[45] Jun. 30, 1981

[54] ROTARY SHEAR

[75] Inventors: Howard D. Speer, Jr., Fayetteville, N.C.; Mark A. Proett, Missouri City, Tex.

[73] Assignee: The Black & Decker Manufacturing Company, Towson, Md.

[21] Appl. No.: 43,386

[22] Filed: May 29, 1979

[51] Int. Cl.³ .............................................. B26B 15/00
[52] U.S. Cl. .............................................. 30/40; 64/29
[58] Field of Search ................. 30/206, 207, 240, 228, 30/265, 393; 64/29

[56] References Cited

U.S. PATENT DOCUMENTS

| 2,042,097 | 5/1936 | Havanas | 30/265 X |
|---|---|---|---|
| 2,570,195 | 10/1951 | Bird | 30/265 X |
| 2,642,658 | 6/1953 | Johnson | 30/265 X |
| 2,946,358 | 7/1960 | Bruck | 30/393 |
| 3,688,522 | 9/1972 | Schmuck | 64/29 |
| 3,827,259 | 8/1974 | Brucker | 64/29 |
| 3,906,629 | 9/1975 | Fuchs | 30/240 |

Primary Examiner—Jimmy C. Peters
Attorney, Agent, or Firm—Harness, Dickey & Pierce

[57] ABSTRACT

An improved rotary power shear that includes an electric motor which drives, through a reduction gear assembly, a rotary shear assembly comprised of a driving shear wheel which rotates against a cooperating driven shear wheel. The design of the tool is characterized by a handle that extends above the motor housing and gear casing, and which supports the tool at one end from the gear casing and at the other end from the rear of the motor housing. In this manner the tool is balanced when held by the handle as the weight of the gear casing and cutting assembly at the forward end of the tool offsets the weight of the motor at the rearward end of the tool. In addition, the design of the tool is facilitated by the provision of a single bracket member that serves the multiple functions of supporting and biasing together the rotary shear wheels, providing a cover for the gear casing, and also providing a support for the stub shafts on which the gears are journalled. An overload release clutch is also incorporated into the reduction gear assembly to protect the tool from being damaged by excessive workpiece resistance. The preferred embodiment of the tool further includes a forward-and-reverse switching capability.

13 Claims, 5 Drawing Figures

ROTARY SHEAR

BACKGROUND AND SUMMARY OF THE INVENTION

The present invention relates to rotary power shears and in particular to an improved rotary shear design that is safe, easy to operate and inexpensive to manufacture.

Rotary power shears of the type to which the present invention pertains are known in the art and typically comprise a motor driven worm gear which extends axially from the end of the motor shaft and which in turn drives a shear wheel that rotates against a cooperating driven shear wheel. Material to be cut is fed between the shear wheels where it is cut and then passed below the motor housing which typically serves also as the handle for the tool.

The present invention seeks to provide an improved rotary shear design that provides better balance for better control of the cutting head. With conventional rotary shears, the motor housing either comprises the handle for the tool as noted or serves as a support for a handle which is typically fastened to the end of the motor housing opposite the cutting head. This arrangement creates an imbalance in the tool due to the extension of the gear box and cutting head assembly beyond the front end of the motor. In other words, the tool tends to feel "front-heavy" when operated. This in turn compromises the ease with which the tool can be controlled, particularly when used to make irregular-shaped or lengthy cuts. The present invention eliminates this disadvantage by providing a rotary shear design having a handle that extends above the motor housing and gear box and which supports the tool from the gear box at one end and the rear of the motor housing at the other. In this manner, the tool is almost perfectly balanced when held by the handle. In addition, the position of the handle serves to remove the operator's hand from the vicinity of the cutting head. This improves the safety of the tool and also insures that the user's hand will not interfere with cut material as it passes beneath the underside of the motor housing.

Additionally, the present rotary shear design eliminates the more expensive worm gearing used in prior art designs and instead utilizes less costly spur gearing to provide the necessary gear reduction to drive the shear wheels. Moreover, the entire gear mechanism is enclosed in a compact gear casing located forward of the motor in the lower front portion of the tool to balance the weight of the motor as described above. As will be more fully discussed in the description of the preferred embodiment, the compactness of the gear casing and cutting head assembly is in part due to the utilization of a single bracket member to support and bias together the shear wheels, provide a cover for the gear casing, and to also provide a bearing support for the stub shafts or pins on which the gears are journalled.

Further improvements in the design of the present rotary shear include an overload release clutch which is provided in the gearing mechanism to protect the tool against excessive torque loads, and a reverse capability which facilitates the removal of a jammed workpiece with minimum damage to the workpiece and also allows easy withdrawal of the tool from a workpiece when making a "blind" cut.

Additional objects and advantages of the present invention will become apparent from a reading of the detailed description of the preferred embodiment which makes reference to the following set of drawings in which:

DETAILED DESCRIPTION OF THE PREFERRED EMBODIMENT

Figure 1:
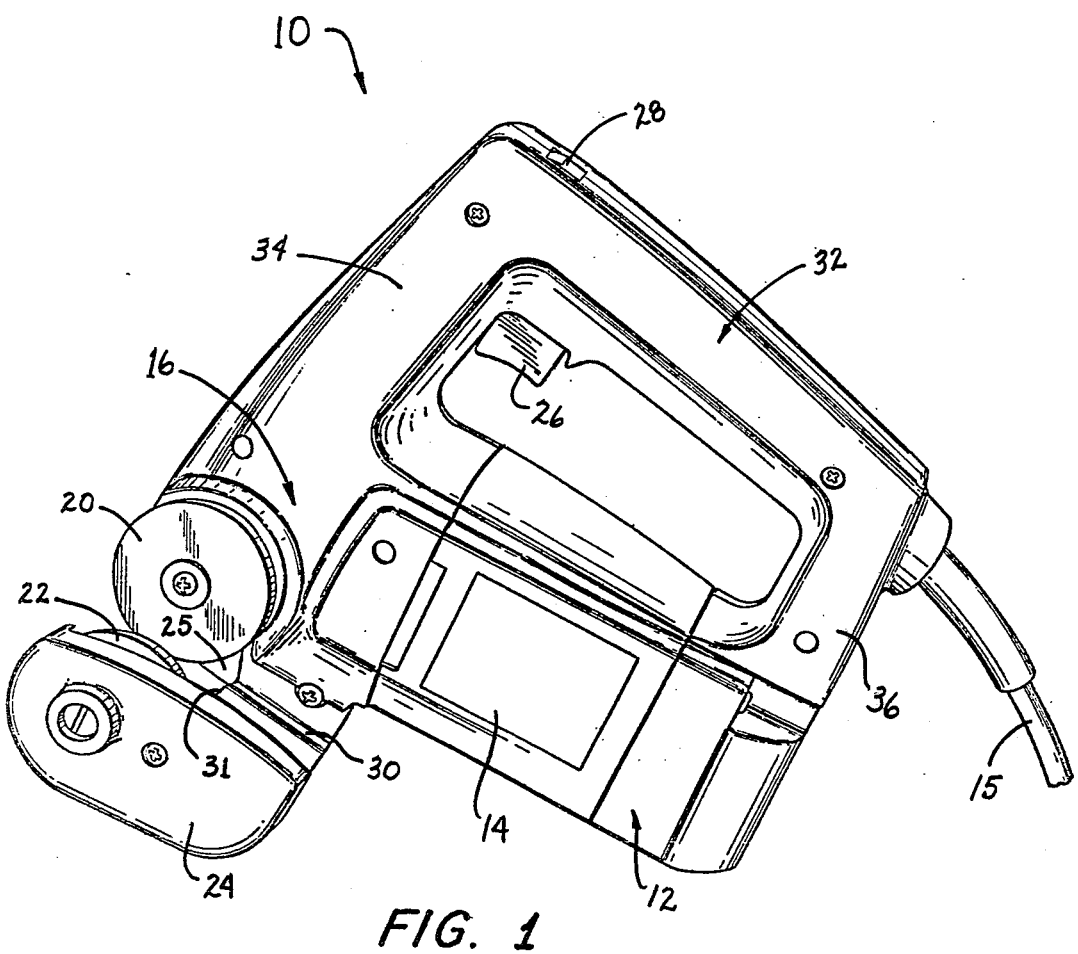
FIG. 1 is a perspective view of a rotary power shear according to the present invention.
Figure 3:
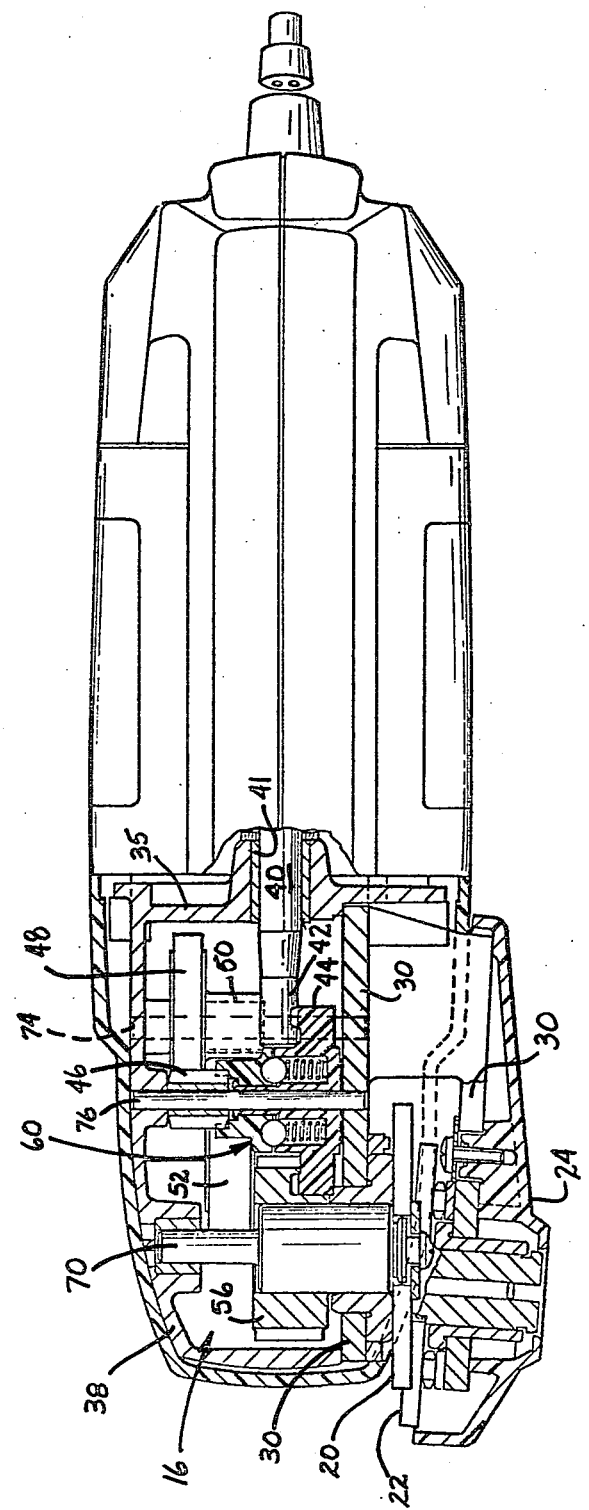
FIG. 3 is a top plan view, partially in section taken along line 3—3 of FIG. 2.

Referring to FIG. 1, a rotary shear 10 according to the present invention is shown. The present rotary shear 10 is adapted to cut a wide variety of materials commonly found in the home or shop such as carpeting, cloth, sheet metal, wire mesh, chicken wire, aluminum siding, cardboard, vinyl tiles and linoleum. Basically, the rotary shear 10 comprises an electric motor 12 which drives through a reduction gear assembly 16, a cutting assembly 18 comprised of a driving and a driven pair of rotary shears, 20 and 22 respectively. The driven rotary shear 22 is offset relative to, and supported directly below, the driving rotary shear 20 by a bracket 30 so that a small portion of the planar surface of the driven rotary shear 22 overlaps the planar surface of the driving rotary shear 20. In addition, as best illustrated in FIG. 3, the driven rotary shear 22 is canted slightly and biased toward the driving rotary shear 20 by the bracket 30 so that the cutting edges of the two rotary shears are biased together at their point of contact to provide a positive shearing action. The biasing function provided by the bracket 30 permits the present rotary shear to be utilized to cut thin, highly flexible material such as cloth.

Material to be cut by the tool 10 is fed between the two shear wheels 20 and 22 where it is severed and then passed below the motor housing 14. It will be noted that the cover 24 which is secured to the bracket 30 to protect the bearings of the driven shear wheel 22, also serves to direct cut material over bracket 30 so that it does not "hang up" on the leading edge 31 of the bracket 30. In addition, another bearing shield 25 disposed over the bearing of the driving shear wheel 20 is provided with a depending portion which serves to direct the remaining portion of cut material below the leading edge 31 of the bracket 30.

The motor 12 is encased in a housing 14 and receives electrical power via a line cord 15 which is connected at its other end to a power source. Operation of the motor 12 is controlled by a switch 26 which in the preferred embodiment is of the variable speed type well known to those skilled in the art. A forward and reverse switch 28 is also preferably provided so that the direction of rotation of the cutting assembly 18 can be reversed. This is a desirable feature that is particularly useful when removing material jammed between the cutting shears 20 and 22, or when withdrawing the tool 10 after making a blind cut.

The overall configuration of the tool 10 is characterized by a handle 32 spaced above the motor housing 14, which is supported by a front portion 34 extending upwardly from, and encompassing at its lower end, the gear assembly 16, and a rear portion 36 extending upwardly from the rear of the motor housing 14. Importantly, it will be appreciated that the configuration and location of the handle 32 is such that when the tool 10 is held by the handle 32, the weight of the motor 12 at one end is almost perfectly balanced by the combined weight of the gear assembly 16 and cutting assembly 18 at the other end. Thus, control over the movement of the tool 10 is greatly improved. In addition, it will further be appreciated that by placing the handle above the motor housing 14 away from the vicinity of the cutting assembly 18, the safety of the tool is improved.

Figure 2:
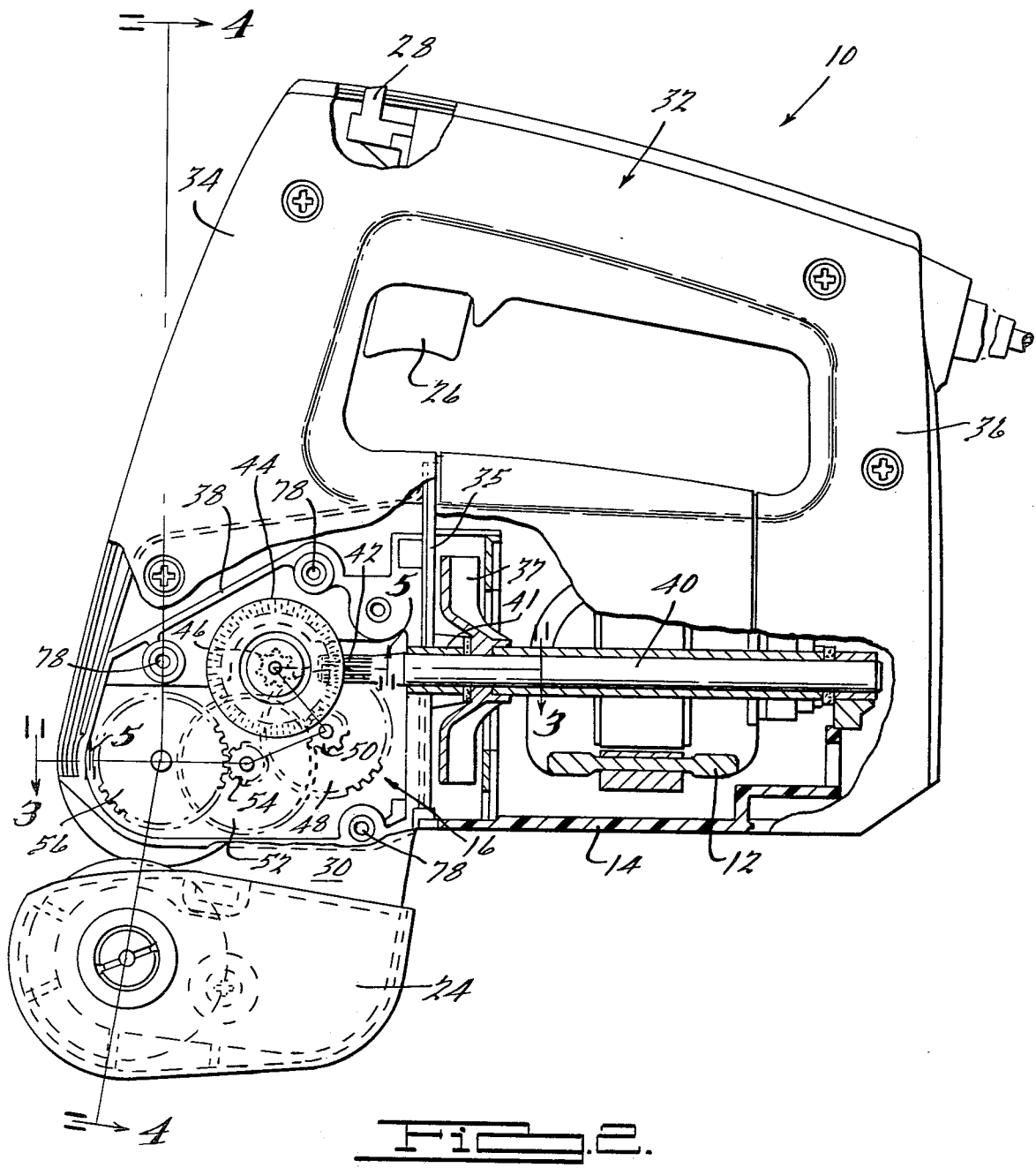
FIG. 2 is a side elevational view, partially cut away, of the rotary power shear illustrated in FIG. 1.
Figure 5:
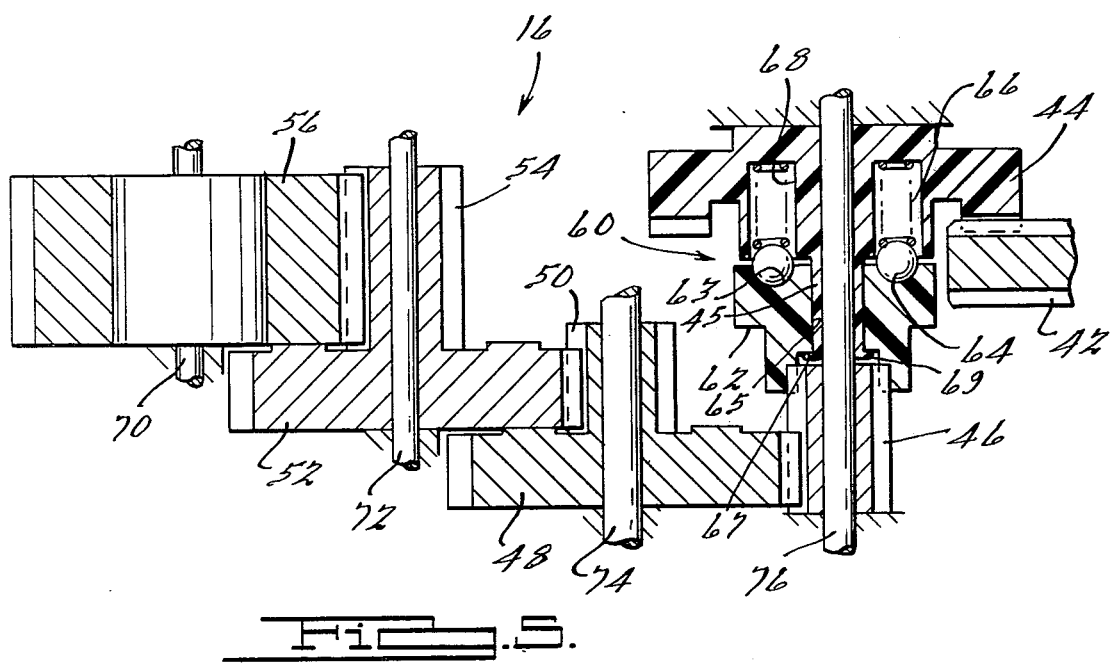
FIG. 5 is a sectional view of the gear assembly taken along line 5—5 of FIG. 2.

Turning now to FIG. 2, a partially cutaway side elevation view of the rotary shear 10 according to the present invention is shown. As can be seen in the drawing, the motor compartment defined by housing 14 is separated from the gear assembly 16 by a transverse wall 35. The shaft 40 of the motor 12 which drives a cooling fan 37, is journalled in a bushing 41 mounted in an opening in the wall 35. The end of the motor shaft 40 extending through the wall 35 defines a pinion gear 42. As best illustrated in FIG. 5, the pinion gear 42 drivingly engages a face gear 44 which comprises the driving member or input element of a torque-responsive overload clutch assembly 60. The clutch assembly 60 further includes a driven member or output element 62 which in turn drives a spur gear 46. Torque is transferred from the driving member 44 of clutch assembly 60 to the driven member 62 through a torque limiting arrangement comprised of a plurality of balls 64 seated in a corresponding plurality of pockets 63 formed in the face of driven member 62. The balls 64 are biased into the pockets 63 of driven member 62 by compression springs 66 disposed in axially extending recesses 68 formed in the opposed face of driving member 44.

Under normal operation the balls 64 are retained in the pockets 63 in driven member 62 by the bias force exerted by springs 66. However, in an overload condition when the workpiece resistance exceeds the level that can properly be handled by the rotary shear 10, the walls of the pockets 63 act upon the balls 64 causing them to compress springs 66 and retract into the recesses 68 in driving member 44, thereby permitting driving member 44 to rotate while driven element 62 remains stationary. Upon removal of the overload condition, the balls 64 will automatically re-seat into the pockets 63 in the driven member 62 under the bias force of the springs 66. The torque threshold release level of the clutch assembly 60 may of course be preset to any desired level by varying the spring tension or in any other known manner.

The primary function of the overload release clutch is to protect the bracket 30 from excessive material resistance. In particular, the biasing function performed by the bracket 30 in supporting the driven shear wheel 22 in the manner described is important to the shearing operation of the tool 10 because it insures that proper forced contact is maintained between the cutting edges of the two shear wheels. If an excessively shear resistant piece of material is fed between the shear wheels, however, the large amount of torque present at the cutting head may nonetheless cause the material to be drawn between the shear wheels 20 and 22. This in turn will result in the shear wheels 20 and 22 being forced apart thereby causing a deformation of the portion of bracket 30 supporting the driven wheel 22. If this deformation is excessive enough, it can result in permanent deformity of the bracket 30 causing a loss of contact between the two shear wheels 20 and 22. While this condition may not affect the tool's ability to cut rigid material such as sheet metal, it can render the tool completely ineffective for cutting flexible material such as cloth. Accordingly, in the preferred embodiment, the torque limit of the overload release clutch 60 is set so that the resulting maximum torque load attainable at the cutting head is not substantial enough to cause permanent deformation of the support bracket 30.

Significantly, it will also be noted that the overload release clutch 60 is located at the output of the motor drive shaft 40 and not at the output of the gear reduction assembly 16 where the rotational speeds are significantly reduced. This is due to the torque loads present at the output of the reduction gear assembly 16 which were determined to be too great to be reliably accommodated by an overload release clutch having the physical dimensions required to fit within the gear casing 38. However, the placing of the clutch at the input of the gear assembly 16 imposed further constraints on the size of the clutch, which in turn presented an assembly problem due to the resulting small size of the clutch components. Consequently, to facilitate assembly of the tool 10, the present overload release clutch 60 is designed to be pre-assembled as a separate sub-assembly so that the small components of the clutch 60 cannot accidentally be dislodged in the gear casing 38 during assembly. This is accomplished by providing the driving member 44 of the clutch 60 with an extended neck portion 45 which is adapted to fit within the enlarged bore 65 of the driven member 62. In this manner, when the clutch 60 is assembled by joining the driving 44 and driven 62 member together, the neck portion 45 will extend slightly beyond the shoulder 67 at the end of the bore 65, thus permitting the neck portion 45 to be cold-staked as shown at 69 and secured to the shoulder 67. Accordingly, it will be appreciated that the present overload release clutch 60 can be easily installed as a complete sub-assembly.

Continuing with the description of the gear assembly 16, spur gear 46, which is driven by the output element 62 of clutch assembly 60, drivingly engages gear 48. The spur gear 50 associated with gear 48 then drives gear 52 whose associated spur gear 54 in turn drives gear 56 which is affixed to the drive shaft 70 of the driving rotary shear 20. In the preferred embodiment of the invention the total gear reduction provided by the gear assembly 16 is 288-to-1.

Figure 4:
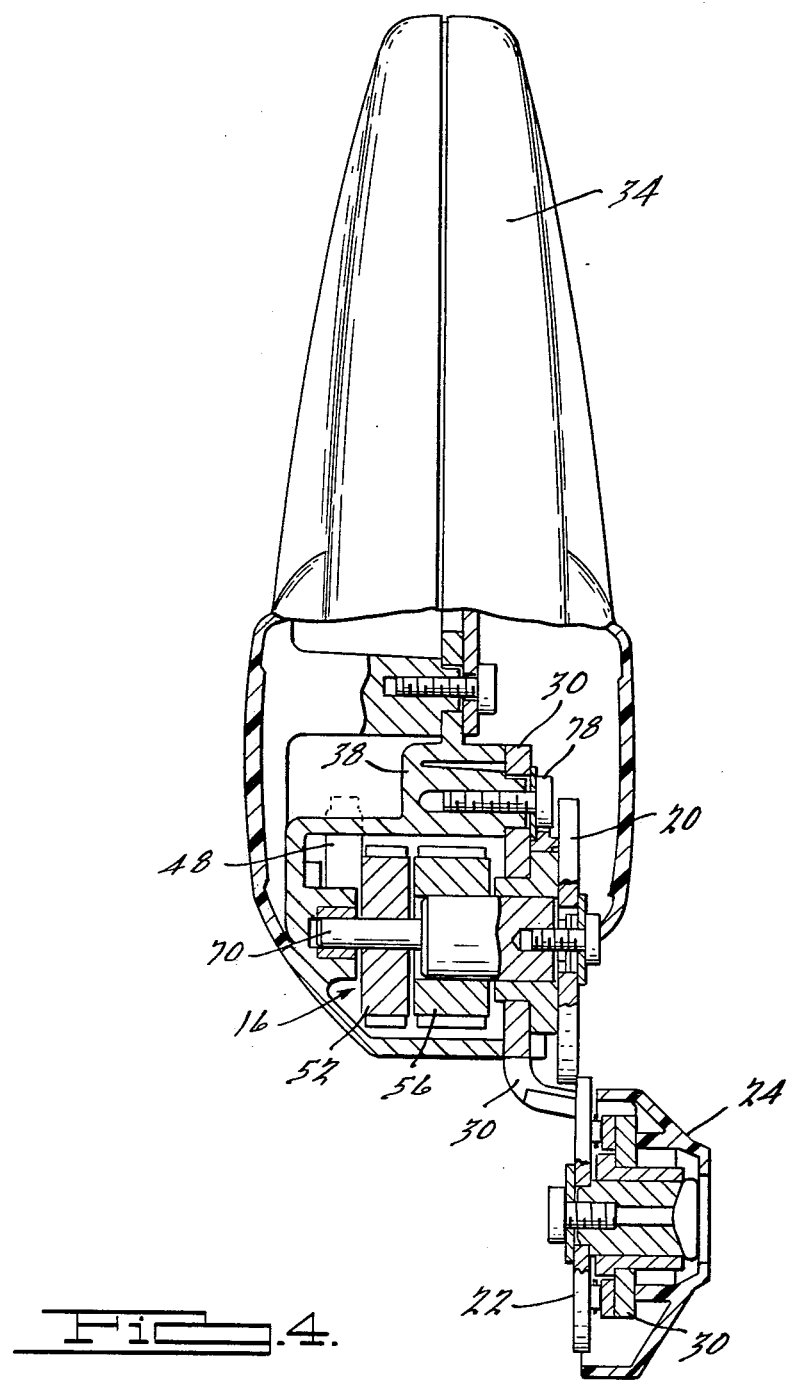
FIG. 4 is a front elevational view, partially in section taken along line 4—4 of FIG. 2.

The gear assembly 16 is housed within a casing 38 that is completely enclosed on the side exposed in FIG. 2 by the bracket member 30, which is the same bracket that extends below the forward end of the tool 10 and supports the driven rotary shear 22 as described above. Bracket member 30 is secured to gear casing 38 by a plurality of bolts 78. Thus, as can best be seen in FIGS. 3 and 4, the gear assembly 16 is completely confined by the enclosure defined by the gear casing 38, the transverse wall 35 and the cover bracket 30. In addition, it will be noted that the bracket member 30 also serves to support the stub shafts 70–76 on which are journalled the entire gear assembly 16. In particular, as best shown in FIG. 3, the stub shafts 70–76 are supported at one end by the gear casing 38 and at the other end by the bracket member 30. Accordingly, it can be seen that the bracket member 30 serves four functions: (1) it supports both the driving and driven rotary shears, 20 and 22 respectively, (2) it biases the driven rotary shear 22 against the driving rotary shear 20, (3) it seals the gear casing 38, and (4) it supports the stub shafts 70-76 of the gear assembly 16.

Thus, it will be appreciated that there is disclosed by the present invention an improved portable rotary power shear that includes an overload release clutch incorporated into a reduction gear assembly comprised of relatively inexpensive spur gearing that is completely enclosed in a compact gear casing which is sealed by a multi-purpose bracket which serves also to support both the journal pins for the gearing and the two rotary shear wheels, as well as providing a bias force between the two shear wheels. In addition, the present design is characterized by an integral overhead handle which supports the gear casing and cutting assembly at the forward end of the tool and the motor housing at the rearward end of the tool, so that the tool is well balanced for good control and easy maneuverability.

While the above description constitutes the preferred embodiment of the present invention, it will be appreciated that the invention is susceptible to modification, variation and change without departing from the proper scope or fair meaning of the accompanying claims.

What is claimed is:

1. An improved heavy-duty hand-held portable rotary shear adapted for cutting a wide variety of materials found in the home and on building construction sites, comprising a housing including a motor compartment, a gear box forwardly of the motor compartment and separated therefrom by a transverse wall, a motor in the motor compartment having a shaft journalled in a bearing in the transverse wall, a driving cutter wheel rotatably journalled in the gear box and having a lower portion protruding below the gear box, right-angle gearing means in the gear box connecting the motor shaft to the driving cutter wheel and providing an in-line cutting action, an overload release clutch in the gearing means, the housing further including a depending portion below the gear box, a driven cutter wheel rotatably journalled in the depending portion of the housing and cooperating with the driving cutter wheel for severing material fed therebetween, the severed material passing below the motor housing, and a handle spaced above and supporting said housing at the rearward end adjacent said motor compartment and at the forward end adjacent said gear box, said handle defining a recess forming a hand grip for the tool and including switch means for controlling said motor, whereby the portable shear has good balance for readily cutting a variety of materials, with the overload release clutch protecting the shear against unusually heavy materials that may be rapidly fed into the shear, and whereby the shearing action of the cooperating cutter wheels is readily viewed by the operator to facilitate close control.

2. An improved heavy-duty hand-held portable rotary shear adapted for cutting a wide variety of materials found in the home and on building construction sites, comprising a housing including a motor compartment, a gear box forwardly of the motor compartment and separated therefrom by a transverse wall, a motor in the motor compartment having a shaft journalled in a bearing in the transverse wall, a driving cutter wheel rotatably journalled in the gear box and having a lower portion protruding below the forward portion of the gear box, right-angle gearing means in the gear box connecting the motor shaft to the driving cutter wheel and providing an in-line cutting action, the housing further including a bracket member providing a cover portion for the gear box and having a lower portion depending below the gear box, the cover portion supporting respective shaft means for mounting the gearing means in the gear box, a driven cutter wheel rotatably journalled in the lower depending portion of said bracket member and cooperating with the driving cutter wheel for severing material fed therebetween, the severed material passing below the motor housing, and a handle spaced above and supporting said housing at the rearward end adjacent said motor compartment and at the forward end adjacent said gear box, said handle defining a recess forming a hand grip for the tool and including switch means for controlling said motor, whereby the portable shear has good balance for readily cutting a variety of materials, and whereby the shearing action of the cooperating cutter wheels is readily viewed by the operator to facilitate close control.

3. A portable electric rotary shear tool adapted for cutting a wide variety of materials, comprising a motor contained in a motor housing, gear reduction means disposed in a casing forwardly of said motor housing and including right angle gearing means drivingly engaged with the output shaft of said motor, at least one shear wheel rotatably journalled to the output shaft of said gear reduction means; said tool being characterized by a handle spaced above said motor housing and said casing so as to define a recess forming a hand grip for the tool and including switch means for controlling said motor and reversing the direction of rotation of said motor and said shear wheel as desired, said handle supporting the tool by said casing at the forward end of the tool and by said motor housing at the rearward end of the tool such that said tool is substantially balanced when held by said handle.

4. The rotary shear tool of claim 3 further comprising a driven shear wheel cooperating with the driving shear wheel such that material that is fed therebetween is severed thereby, and biasing means which supports said pair of shear wheels and biases one of said pair of shear wheels against the other of said pair of shear wheels to facilitate the severing of material fed between said shear wheels and wherein said gear reduction means further includes an overload release clutch to prevent the attainment of torque loads at said shear wheels sufficient to cause permanent deformation of said biasing means.

5. A portable electric rotary shear tool adapted for cutting a wide variety of materials, comprising a motor contained in a motor housing, gear reduction means drivingly engaged with the output shaft of said motor and disposed forwardly of said motor housing within a casing that is closed on one side by a one-piece bracket member which also serves to support the journal pins for the gears in said gear reduction means, and a pair of shear wheels including a driving shear wheel journalled to the output shaft of said gear reduction means and a driven shear wheel cooperating with said driving shear wheel and supported by and journalled to a depending portion of said one-piece bracket member extending below said casing, said depending portion of said one-piece bracket member biasing said driven shear wheel against said driving shear wheel to insure that material fed between said shear wheels is severed thereby.

6. The rotary shear tool of claim 5 wherein said gear reduction means further includes an overload release clutch to prevent the attainment of torque loads at said shear wheels sufficient to cause permanent deformation of said one-piece bracket member.

7. A portable electric rotary shear tool adapted for cutting a wide variety of materials, comprising a motor contained within a housing, switch means for controlling said motor, gear reduction means drivingly engaged with the output shaft of said motor and including an overload release clutch, and a pair of cooperating shear wheels supported by a one-piece bracket member and including a driving shear wheel journalled to the output shaft of said gear reduction means and a driven shear wheel journalled to a depending portion of said one-piece bracket member so that said driven shear wheel is biased by said one-piece bracket member against said driving shear wheel, said overload release clutch being adapted to prevent the attainment of torque loads at said shear wheels sufficient to cause permanent deformation of said one-piece bracket member, and said switch means enabling the direction of rotation of said motor and said pair of shear wheels to be reversed as desired.

8. The rotary shear tool of claim 7 wherein said gear reduction means is disposed within a casing and said one-piece bracket member is further adapted to close said casing on one side and also support the stub shafts upon which the gears in said gear reduction means are journalled.

9. The rotary shear tool of claim 8 wherein said overload release clutch is drivingly engaged with the output shaft of said motor.

10. The rotary shear tool of claim 9 wherein said overload release clutch comprises an input element coupled to the output shaft of said motor, an output element coupled to the output shaft of said gear reduction means, and release means releasably interconnecting said input and output elements for permitting controlled relative motion therebetween whereby said overload release clutch permits slippage between said input element and said output element when said shear wheels encounter a workpiece resistance above a predetermined threshold value.

11. The rotary shear tool of claim 10 wherein said overload release clutch further includes locking means for retaining said input element, said output element, and said release means in an assembled position.

12. A portable electric shear tool adapted for cutting a wide variety of materials, comprising a motor contained within a motor housing, gear reduction means disposed in a casing forwardly of said motor housing and including an overload release clutch drivingly engaged with the output shaft of said motor, a one-piece bracket member closing one side of said casing and supporting the journal pins for the gears in said gear reduction means, and shearing means including a driving shear wheel rotatably journalled to the output shaft of said gear reduction means and a cooperating shear member supported by a depending portion of said one-piece bracket member; said tool being characterized by an integral handle spaced above said motor housing and said casing so as to define a recess forming a hand grip for the tool and including switch means for reversing the direction of rotation of said driving shear wheel as desired, said handle supporting the tool by said casing at the forward end of the tool and by said motor housing at the rearward end of the tool such that said tool is substantially balanced when held by said handle.

13. A portable electric rotary shear tool adapted for cutting a wide variety of materials, comprising a motor contained within a motor housing, rotary cutting means including first and second rotary cutting elements and a one-piece biasing means which supports said first and second cutting elements and biases one of said cutting elements against the other to facilitate the cutting of a workpiece, and gear reduction means interconnecting the output shaft of said motor and said rotary cutting means, said gear reduction means including an overload release clutch comprising an input element coupled to the output shaft of said motor, an output element coupled to the input of said gear reduction means, release means releasably interconnecting said input and output elements for permitting controlled relative motion therebetween whereby said overload release clutch permits slippage between said input element and said output element when said rotary cutting means encounters a workpiece resistance above a predetermined threshold value to prevent attainment of torque loads at said cutting elements sufficient to cause permanent deformation of said one-piece biasing means, and locking means for retaining said input element, said output element, and said release means in an assembled position.

* * * * *